W. R. BRUCE.
CLOVER HEAD HARVESTER OR PICKER.
APPLICATION FILED JULY 26, 1916.
1,206,409.
Patented Nov. 28, 1916.
2 SHEETS—SHEET 1.
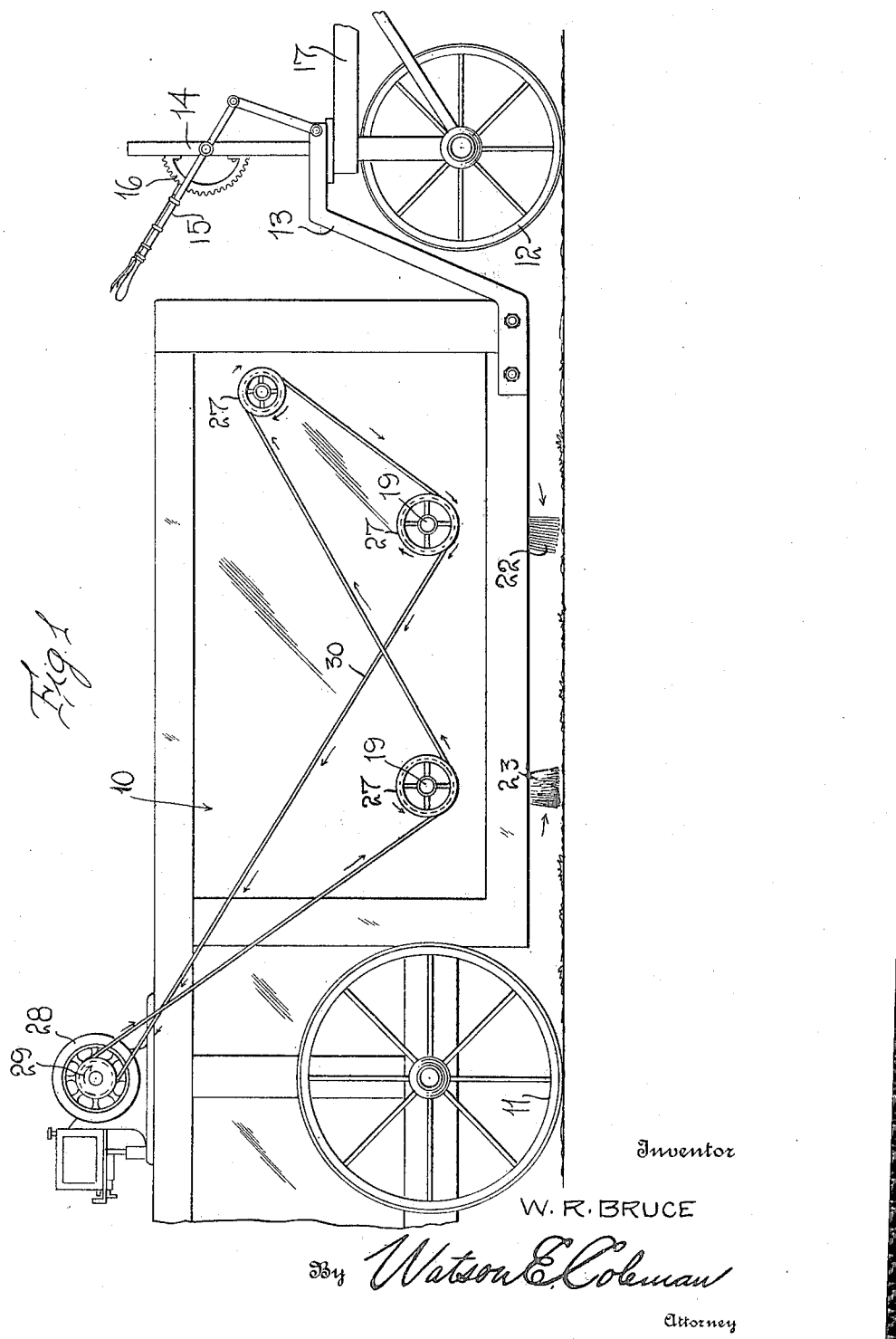
Inventor
W. R. BRUCE
By Watson E. Coleman
Attorney

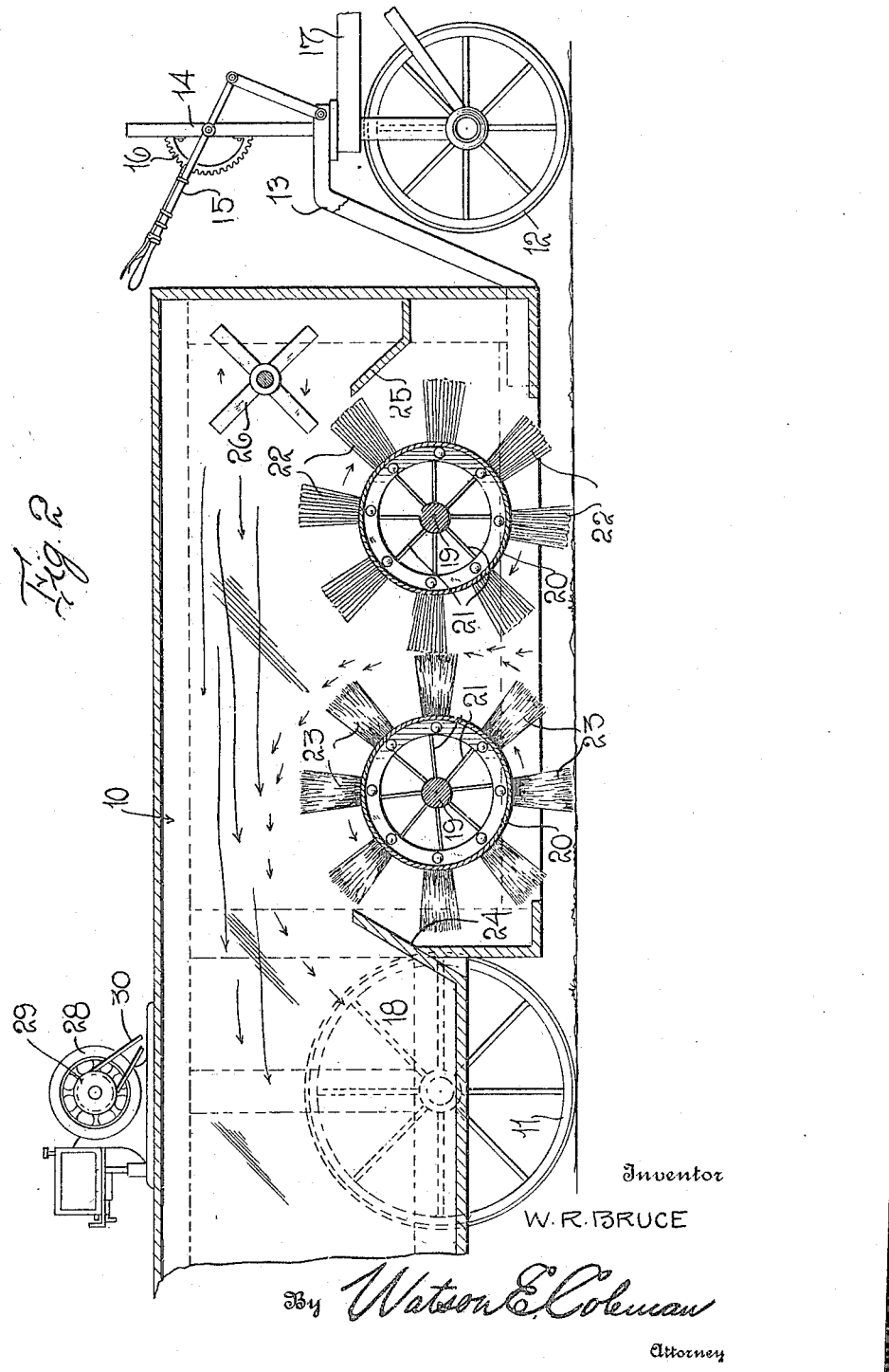

UNITED STATES PATENT OFFICE.

WILLIAM R. BRUCE, OF TWIN FALLS, IDAHO.

CLOVER-HEAD HARVESTER OR PICKER.

1,206,409.

Specification of Letters Patent. Patented Nov. 28, 1916.

Application filed July 26, 1916. Serial No. 111,478.

*To all whom it may concern:*

Be it known that I, WILLIAM R. BRUCE, a citizen of the United States, residing at Twin Falls, in the county of Twin Falls and State of Idaho, have invented certain new and useful Improvements in Clover-Head Harvesters or Pickers, of which the following is a specification, reference being had to the accompanying drawings.

This invention relates to harvesting machines and particularly to machines for picking up loose clover heads from the ground to thus save the seed thereof.

The general object of this invention is to provide means for retrieving clover heads which have been broken off by storms. In many sections of the country there is a very large acreage of clover and it very often happens that before the clover has been harvested a storm comes up which breaks off the clover tops and breaks the stems. The seed is thus wasted and it is the purpose of this invention to provide means for harvesting these broken tops with the seed.

A further object of the invention is to provide a very simple harvesting machine which may be drawn over the field by any suitable power and which will sweep up the seed and in this connection provide means whereby a blast of air may be used to drive the heads and straw into a collecting receptacle while the dirt and other heavy particles drop back onto the ground.

A further object is to provide means whereby the forward end of the machine may be raised to thereby adjust the engagement of the brushes with the ground.

Other objects will appear in the course of the following description.

My invention is illustrated in the accompanying drawings, wherein:

Figure 1 is a side elevation of a clover harvester constructed in accordance with my invention; and Fig. 2 is a longitudinal section thereof.

Referring to these figures, 10 designates an approximately rectangular casing constructed in any suitable manner and supported by the rear wheels 11 and the forward wheels 12, there being a goose neck 13 engaging with the steering post 14 of the front wheel, which goose neck extends downwardly and is operatively engaged with the forward end of the casing 10. The goose neck is vertically adjustable upon the post 14 and a lever 15 is provided which is operatively connected to the goose neck and which is mounted on the post 14 and operates over a sector 16 whereby the forward end of the goose neck may be raised or lowered upon the post 14. The post 14 is operatively connected to a tongue 17 whereby the machine may be drawn and guided.

The casing 10 has its forward portion approximately close to the ground while the rear portion of the casing 10 is slightly raised to form a seed receptacle 18. Disposed in the forward portion of the casing are the transverse shafts 19 which are spaced from each other and operatively mounted upon these shafts are the drums 20 which are held to the shafts by spokes 21, these drums being preferably made of sheet iron. Radiating outward from the forward drum 20 are a plurality of brushes 22 which are made of wire or other suitable material of like character, these brushes being arranged as illustrated in Fig. 2, so as to extend in lines transversely to the line of draft. Mounted upon the rear drum 20 are a plurality of brushes 23 which are preferably made of bristles or like vegetable or animal matter as for instance reed. Just rearward of the path of travel of the brushes 23 is disposed the drop board 24 which defines the forward end of the receptacle 18. Just forward of the forward brushes 22 there is disposed a shield 25 which extends upward and rearward and above the shield is mounted a rotatable fan 26.

The several shafts of the two drums and the fan extend to the exterior of the casing 10 as illustrated in Fig. 1, and mounted upon these shafts are pulleys or band wheels 27. Mounted upon the rear end of the casing 10 is a motor 28 which is illustrated as a gasolene motor and as driving the band wheel 29. A flexible transmission belt or band 30 passes over the band wheel 29, the belt is then crossed and the upper flight of the belt passed downward beneath the pulley 27 on the shaft of the rear drum. The belt then passes upward and over the pulley on the shaft of the fan, then passes downward and under the pulley of the shaft on the forward drum and then passes back to the pulley 29. It will thus be seen that the forward and rear drums are operated in reverse directions and in the direction of the arrows in Fig. 2. The fan is operated in the same direction as the forward drum.

In the operation of my invention, the machine is drawn over the ground by any suitable means and the brushes 22 cast the clover heads rearward and upward into the path of movement of the brushes 23, the brushes 22 and 23 together throw the material up into the path of movement of the air blast from the fan 26 and this air blast drives the clover heads and the seed rearward into the collecting compartment 18, while the dirt or other heavy material drops downward. By vertically adjusting the forward end of the machine, the brushes may be brought into greater or less proximity to the ground so as to most effectively pick up the clover heads. It is to be noted that the forward brushes 22 which are made of wire act to strip clover heads which have not been cut from the stems by a mower or harvester previously passing across the field. Thus clover which is too short to be cut by the knives of the mowing machine or harvester or which has been bent down without being cut will be stripped by these wire brushes.

Having described my invention, what I claim is:

1. A clover head harvester of the character described comprising a casing open at its bottom and formed at its rear with a seed compartment, a pair of rotatable elements mounted in the bottom of the casing and having radially projecting brushes adapted to engage with the ground, so spaced from each other that paths of the confronting ends of the brushes intersect, means for directing a blast of air across the path of travel of the upper portion of the brushes and toward the receptacle at the rear of the machine, and means for rotating the brushes in relatively reverse directions.

2. In a clover head harvester of the character described, a wheeled casing open at the bottom and formed at its rear with a seed compartment, a pair of rotatable elements mounted in the casing and extending transversely thereof, brushes mounted thereon, the paths of travel of the ends of said brushes intersecting, means for rotating said elements in relatively reverse directions to carry seed engaged by the brushes upward into the casing, and a fan mounted above and in advance of the forward rotatable element and directing a blast of air rearward toward the seed compartment and across the upwardly extending bristles of the brushes.

3. In a clover head harvesting machine of the character described, a wheeled casing open at its lower end, having a seed compartment at its rear end, rotatable elements mounted in the casing and extending transversely thereof, a plurality of brushes mounted on each rotatable element, the forward brushes being of wire, a fan mounted in the casing above and in advance of the forward brushes and directing a blast of air rearward toward the seed receptacle and across the upwardly extending bristles of the brushes, and means for driving the fan and driving the rotatable elements in relatively reverse directions to each other.

4. In a clover head harvester of the character described, a casing open at its bottom and formed at its rear with a seed receptacle, wheels supporting the rear end of the casing, a wheeled support for the forward end of the casing, means for vertically adjusting the forward end of the casing upon said wheeled support, a pair of drums rotatably mounted within the casing and extending transversely thereof and having radially projecting brushes, each of said drums including a shaft extending to the exterior of the casing, said drums being so disposed relatively to each other that the paths of travel of the ends of the brushes intersect, a fan mounted in the forward end of the casing above and in advance of the forward drum, said fan including a shaft, a band wheel on the shaft, a motor mounted on the casing, and a belt connection between the motor and the band wheels and driving the forward and rear drums in a clockwise and counter-clockwise direction respectively and driving the fan in the same direction as the forward drum.

In testimony whereof I hereunto affix my signature in the presence of two witnesses.

WILLIAM R. BRUCE.

Witnesses:
J. McMILLAN,
W. O. SMITH.